US012698938B2

(12) United States Patent
Mersmann

(10) Patent No.: US 12,698,938 B2
(45) Date of Patent: Aug. 4, 2026

(54) RAW MEAL DELIVERY DEVICE

(71) Applicant: KHD HUMBOLDT WEDAG GMBH, Cologne (DE)

(72) Inventor: Matthias Mersmann, Stolberg (DE)

(73) Assignee: KHD Humboldt Wedag GmbH, Cologne (DE)

( * ) Notice: Subject to any disclaimer, the term of this patent is extended or adjusted under 35 U.S.C. 154(b) by 380 days.

(21) Appl. No.: 18/261,933

(22) PCT Filed: Jan. 19, 2022

(86) PCT No.: PCT/EP2022/051056
§ 371 (c)(1),
(2) Date: Jul. 18, 2023

(87) PCT Pub. No.: WO2022/157163
PCT Pub. Date: Jul. 28, 2022

(65) Prior Publication Data

US 2024/0159467 A1 May 16, 2024

(30) Foreign Application Priority Data

Jan. 19, 2021 (DE) ......................... 102021100941.3

(51) Int. Cl.
*F27D 3/18* (2006.01)
*F27B 7/32* (2006.01)
*F27D 3/00* (2006.01)

(52) U.S. Cl.
CPC .............. *F27D 3/18* (2013.01); *F27B 7/3205* (2013.01); *F27B 2007/3282* (2013.01); *F27D 2003/0006* (2013.01)

(58) Field of Classification Search
CPC .. F27D 3/18; F27D 2003/0006; F27B 7/3205; F27B 2007/3282
See application file for complete search history.

(56) References Cited

U.S. PATENT DOCUMENTS 3,662,486 A * 5/1972 Freedman ............... A63F 9/088 273/155
4,517,020 A * 5/1985 Steinbiss ................... F27D 3/18 432/105
(Continued)

FOREIGN PATENT DOCUMENTS

CN 106996700 A * 8/2017 ............... F27D 3/10
CN 110617704 A 12/2019
(Continued)

OTHER PUBLICATIONS

International Search Report for International Patent Application No. PCT/EP2022/051056 dated May 11, 2022; priority document.

*Primary Examiner* — Saul Rodriguez
*Assistant Examiner* — Ashley K Romano
(74) *Attorney, Agent, or Firm* — Greer, Burns & Crain, Ltd.

(57) ABSTRACT

A raw meal delivery device for delivering raw meal into a gas line or a reactor of a system for producing cement clinker, having a connection line for connecting a raw meal line to the gas line or the reactor, an oblique raw meal chute arranged inside the connection line and via which raw meal passes from the raw meal line into the gas line or to the reactor, a baffle slide arranged at the foot of the raw meal chute and protruding into the path of the raw meal flowing via the raw meal chute and deflecting the incoming raw meal. A substantially convex displacement body is arranged on the baffle slide and lies in the path of the incoming raw meal and disperses the flow of raw meal. The displacement body disperses the raw meal on entry into the calciner with the effect of quicker calcination.

9 Claims, 5 Drawing Sheets

(56) References Cited

U.S. PATENT DOCUMENTS

| | | | | | |
|---|---|---|---|---|---|
| 4,543,061 | A * | 9/1985 | Edwards | F27B 7/3205 432/115 |
| 5,122,346 | A * | 6/1992 | Wormser | F23C 10/20 422/142 |
| 5,472,173 | A * | 12/1995 | Laszlo | B22D 41/04 266/236 |
| 6,345,981 | B1 | 2/2002 | Hansen et al. | |
| 11,634,241 | B1 * | 4/2023 | Pawelski | B64G 1/1081 219/243 |
| 2002/0093128 | A1 * | 7/2002 | Koffron | F27D 3/1536 266/227 |
| 2003/0089282 | A1 | 5/2003 | Steffler et al. | |
| 2005/0069832 | A1 | 3/2005 | Townsend et al. | |
| 2011/0173139 | A1 * | 7/2011 | Zauderer | G06Q 99/00 166/308.1 |
| 2012/0243969 | A1 * | 9/2012 | Lin | F27D 5/00 414/804 |
| 2014/0261574 | A1 * | 9/2014 | Tebbens | F23J 3/00 239/722 |
| 2017/0209864 | A1 * | 7/2017 | Grisham | G01N 33/5094 |
| 2017/0218470 | A1 * | 8/2017 | Abel | F27B 3/205 |
| 2021/0009455 | A1 * | 1/2021 | Yamamoto | F27B 7/3205 |
| 2021/0125681 | A1 * | 4/2021 | Kennefick | G06F 30/23 |
| 2021/0198142 | A1 * | 7/2021 | Lemke | F27B 7/362 |
| 2023/0152037 | A1 * | 5/2023 | Dinkova | F27B 7/42 432/49 |
| 2023/0194173 | A1 * | 6/2023 | Yamamoto | B65G 33/08 414/206 |
| 2024/0418506 | A1 * | 12/2024 | Kennefick | G01B 21/22 |
| 2025/0146754 | A1 * | 5/2025 | Thomas | F27B 7/10 |

FOREIGN PATENT DOCUMENTS

| | | | |
|---|---|---|---|
| DE | 2312379 | A1 | 9/1974 |
| EP | 1310467 | B1 | 3/2010 |
| WO | 8904445 | A1 | 5/1989 |
| WO | 0107853 | A1 | 2/2001 |

* cited by examiner

PRIOR ART

RAW MEAL DELIVERY DEVICE

CROSS-REFERENCES TO RELATED APPLICATIONS

This application claims the benefit of the International Application No. PCT/EP2022/051056, filed on Jan. 19, 2022, and of the German patent application No. 102021100941.3 filed on Jan. 19, 2021, the entire disclosures of which are incorporated herein by way of reference.

FIELD OF THE INVENTION

The invention relates to a raw meal delivery device for the delivery of raw meal into a gas line, such as a riser of a heat exchanger cyclone, or to a reactor, such as a calciner, of a layout for production of cement clinker, comprising a connection line for connecting a raw meal line to the gas line or the reactor, an inclined raw meal chute, which is situated inside the connection line and by which raw meal gets from the raw meal line into the gas line or the reactor, wherein at the foot of the raw meal chute there is arranged a baffle slide, which protrudes into the path of the raw meal flowing along the raw meal chute and deflects the incoming raw meal.

BACKGROUND OF THE INVENTION

During the production of cement clinker from a mixture of ground calcareous rock and ground silicate-containing rock, the so-called raw meal in the dust phase undergoes a heat treatment in a gas flow, after which it is sintered in a rotary kiln. The raw meal in a major portion of the layout is present suspended in a hot gas. In a typical layout for the production of cement clinker, each day between 1000 T and 10,000 T of cement clinker are produced, the raw meal being transported as the starting product suspended in gas within the layout through a cyclone heat exchanger. After the heating and possibly drying of the raw meal in the cyclone heat exchanger, the raw meal is taken by a raw meal line to a calciner, constituting an entrained flow reactor, where the calcareous rock of the raw meal is broken down by thermolysis into quicklime (CaO) and carbon dioxide (CO2). The quicklime is taken as part of the hot meal to a rotary kiln, where it is sintered by intensive heat treatment to calcium silicate phases, or the actual cement clinker. The cement clinker after the rotary kiln needs to undergo a rapid cooldown in order to obtain the desired clinker phases.

In lengthy investigations as to where the bottlenecks for the overall performance of the layout are located in a layout for the production of cement clinker, the same locations keep coming up. One of these locations is the calciner, an entrained flow reactor, in which the raw meal is to be thermally dissociated as completely as possible. Little time remains for this in the entrained flow reactor, since the flow velocity in the calciner is so great that the dwell time of the preheated raw meal in the calciner is only a few seconds. In order to boost the performance of a layout, it is of course possible to enlarge all the components of the layout. The dwell time of the raw meal in the calciner can also be lengthened in this case. In order to optimize existing layouts, a retrofitting or a new construction would be too costly. During plant optimization, the diameters of pipelines are often enlarged, so that a greater gas and/or mass flow per unit of time can pass through the layout. With increasing production capacity of modern layouts, the diameters of the gas-carrying pipelines also increase, which makes it hard to achieve the most homogenous possible dispersion of the meal in the gas flow. Serious process disturbances often occur with an inadequate distribution, such as meal drop-through, reaction constraints, and other unwanted performance deficits of the layout.

Another place where bottlenecks exist is the riser in cyclone heat exchangers. In cyclone heat exchangers, the raw meal is repeatedly suspended and then separated in the gas phase of the exhaust air of a rotary kiln. In this process, the raw meal takes up the heat from the rotary kiln exhaust gas. The distance available for the suspending of the raw meal, and thus the time, is very short. Here as well, a faster and uniform delivery of the meal to the gas phase can help increase the overall throughput and efficiency of the layout.

In European patent EP 1 310 467 B1 there is disclosed a meal entrance box as a raw meal delivery device, in which a baffle slide is present at the foot of the meal entrance box. The baffle slide has the task of breaking up and spreading out the raw meal stream coming from a chute. This meal entrance box has proven to work well in existing layouts for production of cement clinker.

The problem to be addressed by the invention is to boost the performance of a layout for the production of cement clinker. For this, the uniformity of the pneumatic transport of the meal/gas suspension after the dispersion of the meal should be increased and the pressure fluctuation which often occurs locally and temporarily in the case of poor dispersion should be prevented, while also optimizing the accessibility of the fine meal flow for the heat exchange due to better dispersion.

SUMMARY OF THE INVENTION

The problem is solved according to the invention by arranging a substantially convex displacement body on the baffle slide, which lies in the path of the incoming raw meal and disperses the flow of raw meal.

According to the invention, in order to boost the performance of the layout, it is thus proposed to attach this to the raw meal delivery device for a gas line, such as a riser of a heat exchanger cyclone, or for a reactor, such as a calciner.

The displacement body imposes on the flowing meal at the time of its entrance into the gas line or the reactor an outward velocity and momentum component, so that the raw meal is forced more into the outer regions of the gas line or the reactor. This deflection is realized by a substantially convex surface geometry, which is present in the path of the flowing raw meal. In the simplest case, the displacement body can be a tetrahedral body, being a tetrahedron lying on a surface, one edge of the tetrahedron being oriented from the bottom of the baffle slide in the flow direction of the flowing raw meal. This tetrahedral body cuts through the flow of dispersed raw meal and imparts an outward velocity and momentum component to the raw meal. The displacement body can also have a hull-like shape or consist of a harmonic arching, having a keel line located at the top.

For the retrofitting of existing raw meal delivery devices it has proven to be advantageous for the displacement body to be a tetrahedron and for one side of the tetrahedron situated in the flow direction to be an obtuse triangle. The keel line or crest line of the displacement body is thus obtuse-angled. This shape results in an efficient widening of the raw meal stream in the gas line or in the reactor, so that the thermolysis of the calcareous rock begins very early and uniformly in a calciner as the reactor. When used in a riser of a heat exchanger cyclone, the suspending of the raw meal likewise occurs earlier and more uniformly, so that the raw meal does not fall through the cyclone as a cohesive stream, but instead is fully suspended in the gas swirl. By canceling out the pressure loss-generating flow, reserves in the flow control can be reduced and in this way the layout can be operated at a higher production level.

The keel line, crest line or upward pointing edge of the displacement body advantageously has an abrasion-resistant reinforcement, such as one in the form of a hardfacing, in order to increase the service life of the displacement body in the hot raw meal stream. For this, it can also be provided that the side of the displacement body, for example the tetrahedron, which is present in the flow direction is open. The open design prevents the displacement body from becoming heated too much, or being so heavily stressed in the heat of the flowing raw meal that the displacement body becomes brittle due to alternating thermal stresses. The service life of the displacement body is also increased by indentations in the displacement surfaces, namely, the surfaces emerging from the edge, the keel line or the crest line, namely in the edge lying transversely to the flow direction. The indentations prevent the formation of eddies and prevent excessively large alternating mechanical stresses during alternating thermal stresses. Like expansion joints, the indentations ensure that the displacement body does not become deformed under the thermal load.

In order to achieve an optimal distribution of the raw meal, it can be provided that the bottom surface of the substantially convex displacement body extends for at least 50% across the width of the baffle slide, preferably entirely across the complete width of the baffle slide. An extension across the entire width is advantageous for spreading out the entire raw meal stream.

BRIEF DESCRIPTION OF THE DRAWINGS

The invention shall be explained more closely with the aid of the following figures.

DETAILED DESCRIPTION OF THE PREFERRED EMBODIMENTS

Figure 1:
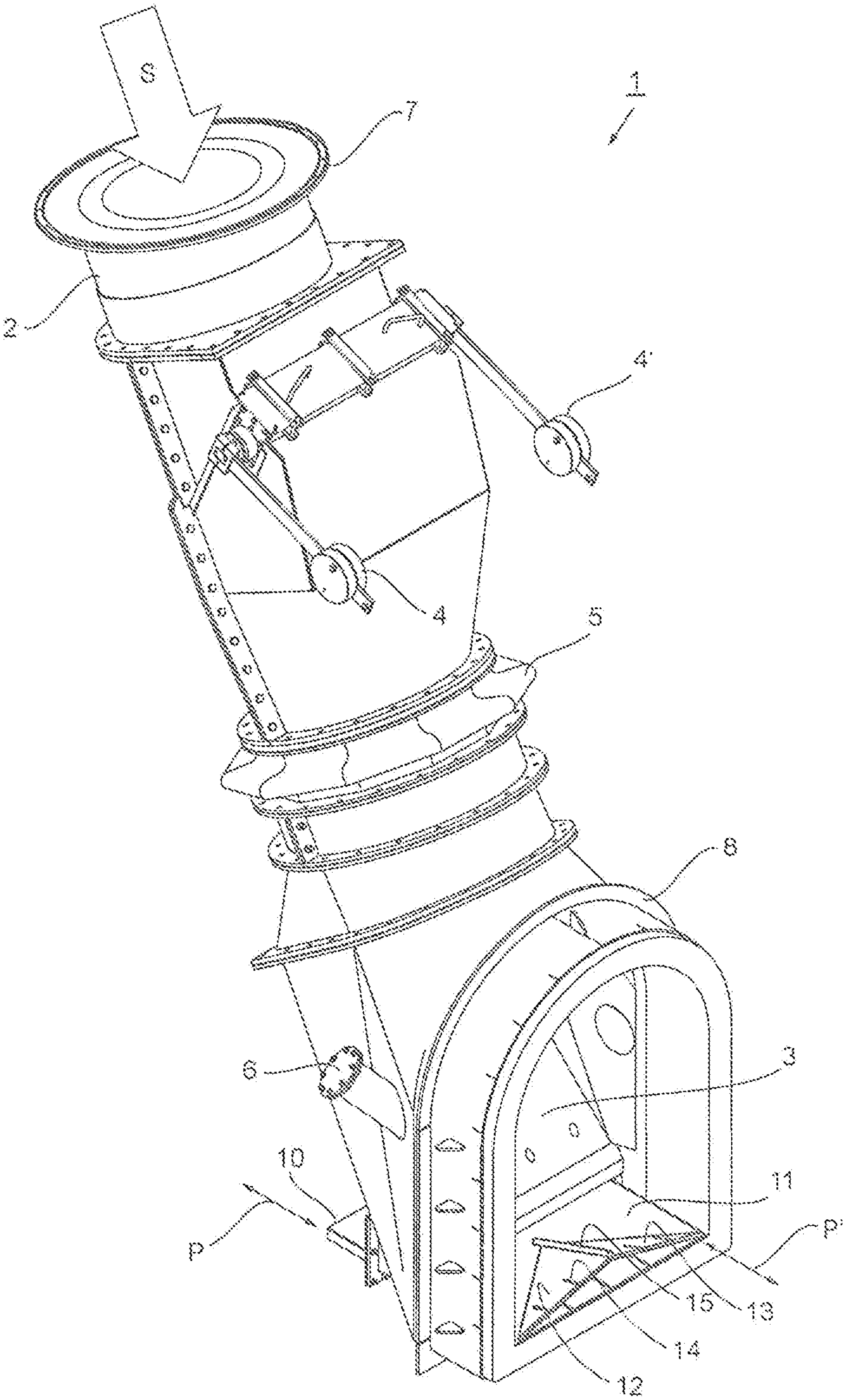
FIG. 1 shows a raw meal delivery device according to the invention.

FIG. 1 shows a raw meal delivery device 1 according to the invention. The raw meal delivery device 1 is intended for attachment to a gas line, such as a riser 112', 113' of a heat exchanger cyclone 112, 113 in a cyclone heat exchanger 110, or for attachment to a reactor, such as a calciner 170, of a layout 100 for the production of cement clinker. Such a layout is shown as an example in FIG. 5. In the raw meal delivery device 1 shown here, there is a connection line 2 for connecting a raw meal line 120 coming from a cyclone heat exchanger 110 to the calciner 170 or to the riser 112', 113' of a next heat exchanger cyclone 112, 113. Furthermore, the raw meal delivery device 1 comprises an inclined raw meal chute 3, which is situated inside the connection line 2 and by which raw meal gets from the raw meal line 120 to the gas line or to the reactor. In the path of the connection line 2 there is located a compensator 5, in order to balance out the thermal load, but also to balance out a mechanical load exerted by the sometimes rather long raw meal line 120 on the raw meal delivery device 1. At the foot of the raw meal chute 3 there is situated an outside-adjustable baffle slide 10, which protrudes into the path of the raw meal flowing along the raw meal chute 3 and which deflects the incoming raw meal. The mere striking against the bottom 11 of the baffle slide 10 already produces a broad fountain of raw meal at the entrance to the gas line or to the reactor. According to the invention proposed here, it is provided that a substantially convex displacement body is situated on the baffle slide 10, which lies in the path of the incoming raw meal and disperses the stream of raw meal. The displacement body in the exemplary embodiment here is formed by a tetrahedron T, which is open in the flow direction S and has an obtuse angle at its keel line, its crest line, or its edge 15 protruding into the raw meal stream. This keel line, its crest line or its edge 15 protruding into the raw meal stream is oriented in the flow direction S. The two surfaces 12 and 13 emerging from the edge 15 impart an outward momentum to the raw meal, which further significantly intensifies the dispersing action of the raw meal delivery device. This intensified dispersion has the result in the calciner that the thermolysis of the calcareous rock in the calciner, which is generally an entrained flow reactor, takes place earlier and is better distributed over the gas flow. This effect of improved distribution is especially effective and significant when the diameter of the calciner increases greatly for large layouts, in the range of a daily tonnage output of 5000 T and even 8000 T to over 10,000 T. In a riser 112', 113' of a cyclone heat exchanger 110, the intensified dispersion has the benefit of a faster and more complete suspending of the raw meal in the gas flow of the heat exchanger cyclone 112, 113. The raw meal delivery device 1 is connected at the top across a flange 7 for example to the raw meal line 120 of the layout 100 for production of cement clinker. The raw meal drops in the flow direction S inside the connection line 2 along the raw meal chute 3 and is taken through a check valve, of which only two outer weights 4 and 4' for a non-return flap are shown here. At the foot of the raw meal delivery device 1 there is an optional fuel supply 6, with which fuel such as petroleum coke can be fed into the raw meal to boost the thermal power in the calciner. The raw meal delivery device 1 is mounted by means of the flange 8 on the thick-wall calciner 170.

In order to adjust the ideal dispersion, the baffle slide 10 can be pushed back and forth from the outside along the direction of the double arrows P and P'. Since the displacement body, here the tetrahedron, is arranged on the bottom 11 of the baffle slide 10, the displacement body moves along with the baffle slide 10.

Figure 2:
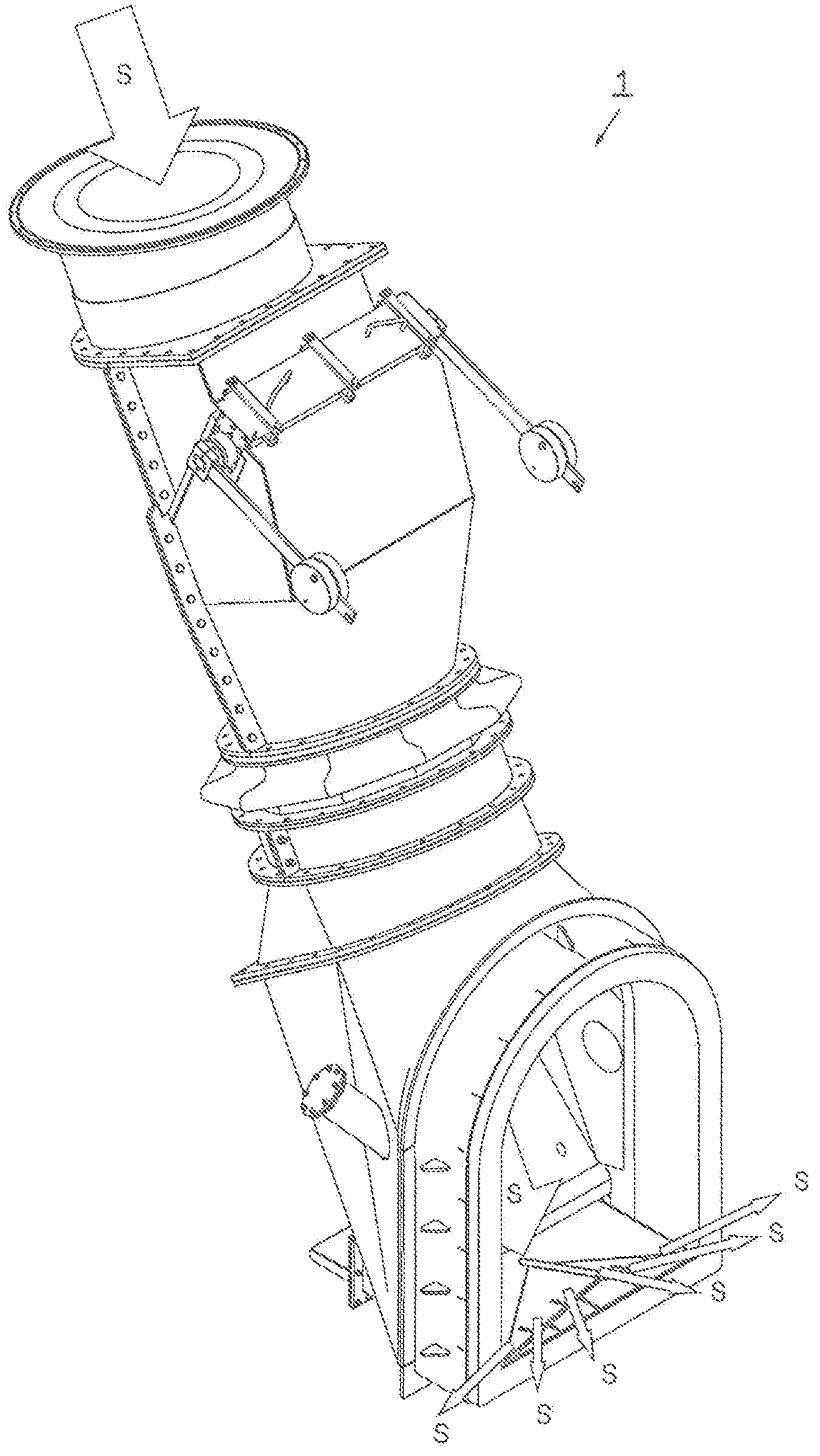
FIG. 2 shows the raw meal delivery device of FIG. 1, indicating the flow directions, at the foot of the raw meal delivery device.

FIG. 2 shows the raw meal delivery device of FIG. 1 with flow directions S indicated at the foot of the raw meal delivery device 1. This FIG. 2 illustrates the action of the displacement body, here in the form of the tetrahedron T, on the raw meal sliding down the chute 3 from above. The raw meal is given an outward velocity and momentum component and thus broadens out in the open diameter of the calciner 170 or the riser 112', 113'.

Figure 3:
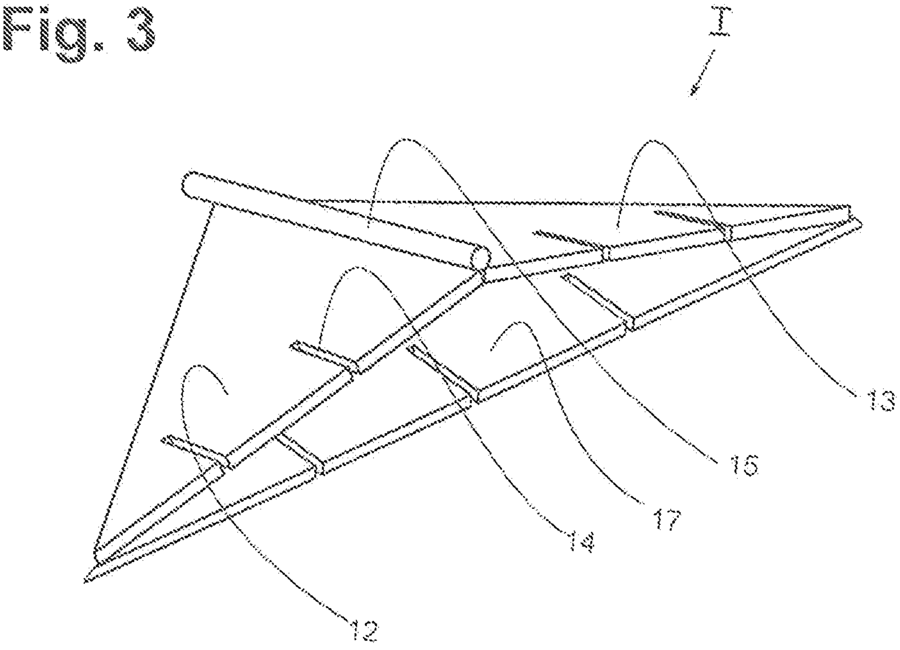
FIG. 3 shows a convex displacement body in the form of an open tetrahedron.

FIG. 3 shows a convex displacement body in the form of an open tetrahedron T. This tetrahedron T lies with one surface 17 on the bottom 11 of the baffle slide. The edge 15 opposite the surface 17 is oriented collinearly with the flow direction S. In this way, the edge 15 acts like the keel of a displacer. The surfaces 12 and 13 emerging from the edge 15 are positioned such that the raw meal flowing over them is given an outward velocity and momentum component. In order to prevent unwanted swirling and also to suppress thermal/mechanical stresses, indentations 14 may be present in the surfaces 12 and 13 emerging from the edge 15, namely, in the edges situated in the flow direction S. These have an action similar to expansion joints to prevent mechanical stress.

Figure 4:
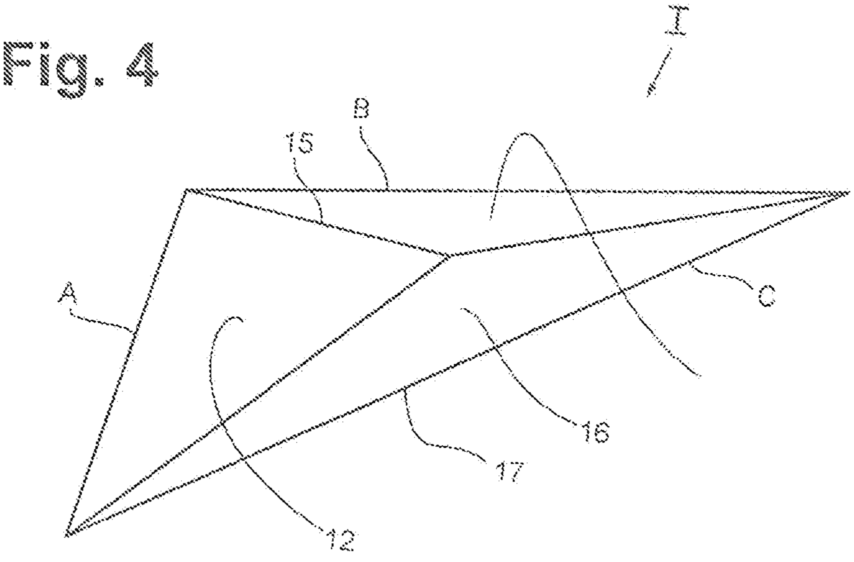
FIG. 4 shows the tetrahedron of FIG. 3 in simplified form for designating the surfaces and edges.

FIG. 4 shows the tetrahedron of FIG. 3 in simplified form in order to designate the surfaces and edges. The tetrahedron of FIG. 3 is shown here in simplified form as a substantially convex displacement body. The tetrahedron lies with one surface 17 on the bottom 11. The four surfaces of the tetrahedron are the surface 17 lying on the bottom 11, the two surfaces 12 and 13 emerging from the edge 15 opposite the surface 17, and the surface 16 pointing forward in the flow direction. The edge 15 opposite the surface 17 points in the flow direction S of the raw meal. As the displacement body, the tetrahedron T may be open in the surface 16 lying in the flow direction S.

Figure 5:
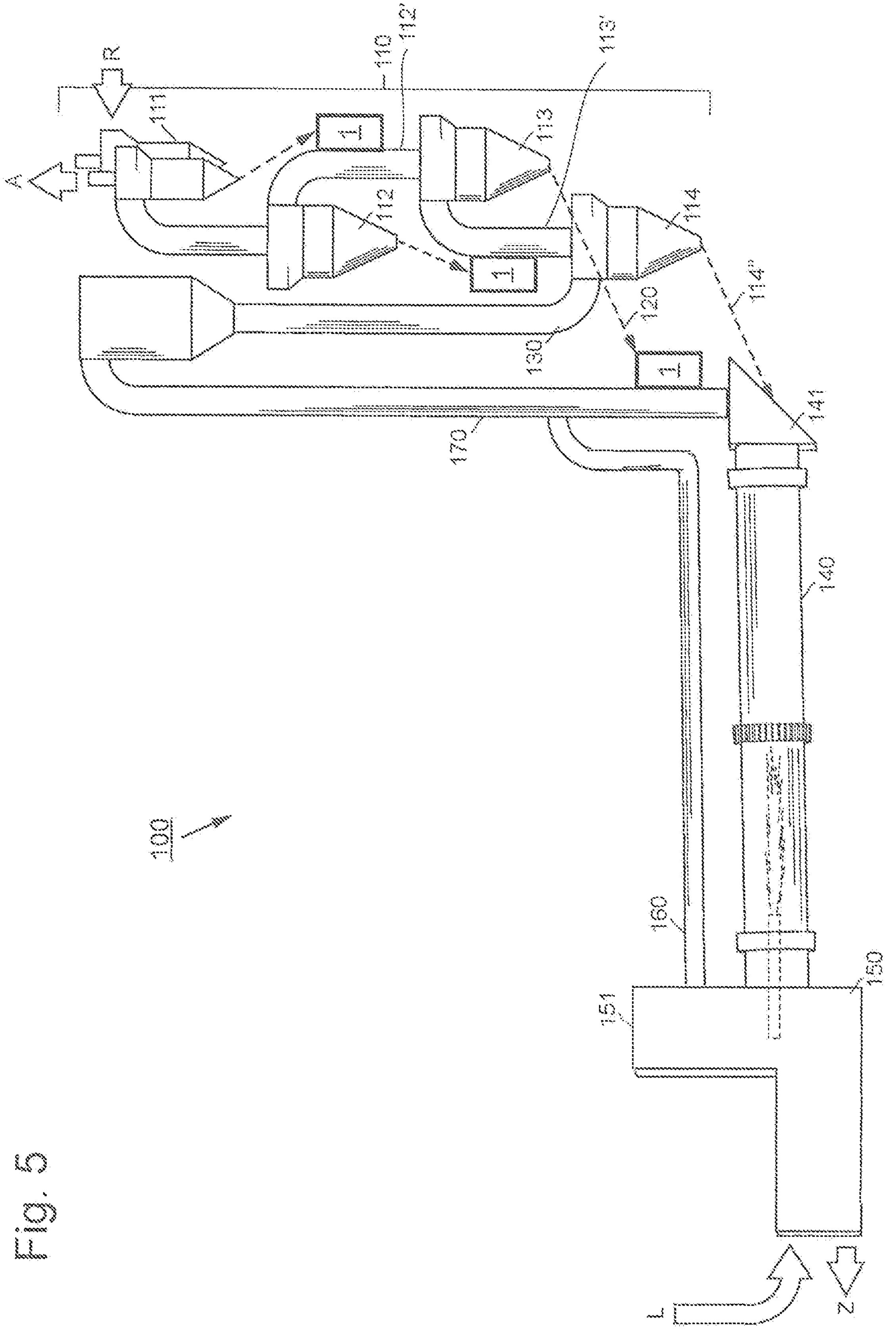
FIG. 5 shows an exemplary layout for the production of cement clinker in order to demonstrate where the raw meal delivery device is located in the layout.
Figure 6:
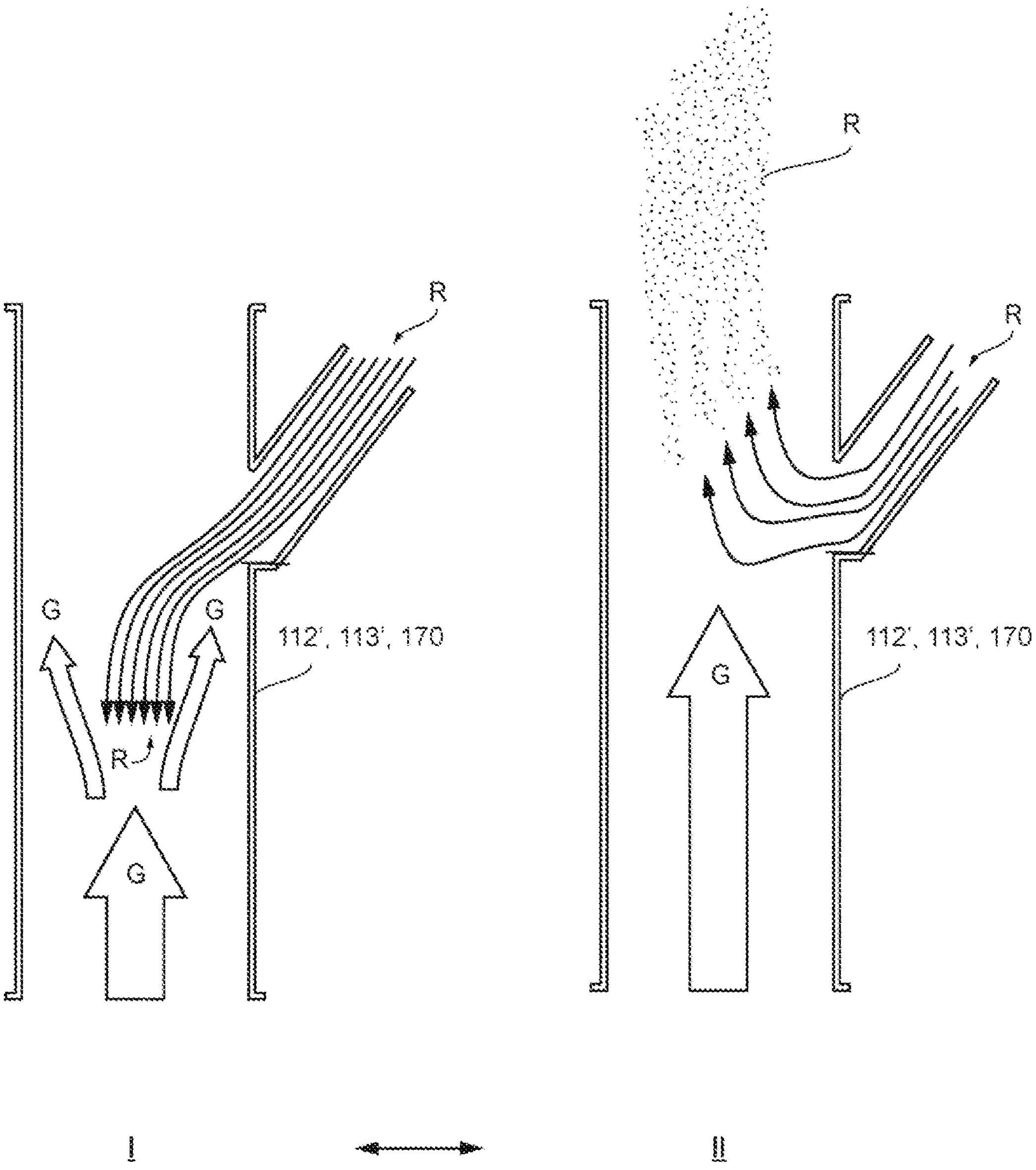
FIG. 6 shows a raw meal feed line, as realized in the PRIOR ART, in two alternate states.

FIG. 5 shows an exemplary layout 100 for the production of cement clinker, being shown as a demonstration, where the raw meal delivery device 1 has its place in the layout 100. The layout 100 comprises the following plant components: in the material flow direction at the beginning is located a heat exchanger component 110. This comprises multiple cyclone heat exchangers 111, 112, 113, 114 hooked up in succession for the preheating of the raw meal R. Following the next to last cyclone heat exchanger 113 in the material flow direction is a calciner 170, in which the preheated raw meal R flows from the heat exchanger component 110. In the calciner 170, the raw meal R is suspended in the exhaust air of a following rotary kiln 140, while the outlet on the descending branch 130 of the calciner 170 is connected to an inlet of the last cyclone heat exchanger 114. The last cyclone heat exchanger 114 is followed by a connection line 114" leading to a rotary kiln inlet chamber 141 and supplying the preheated raw meal R, deacidified in the calciner 170, to the rotary kiln 140. The preheated and deacidified raw meal R rolls through the rotary kiln 140 and is sintered into cement clinker Z. Following the rotary kiln 140 in the material flow direction is a cement clinker cooler 150, while from the cooling head housing 151 directly connected to the rotary kiln 140 a tertiary air line 160 leads to the calciner 170, in order to maintain here a burning of fuel in an oxidative environment. The cooled cement clinker Z, on the other hand, leaves the cement clinker cooler 150. Atmospheric air L runs for the most part contrary to the material flow of the raw meal R in the layout 100. Thus, the air L flows into the cement clinker cooler 150 and is divided here into different fractions. A first portion of the air L flows as so-called primary air to a burner, designated by a dashed line. A second fraction of the air L flows as secondary air to the rotary kiln 140 and a third fraction of the air L heated in the cement clinker cooler 150 flows as tertiary air through the tertiary air line 160. After leaving the calciner 170, the air L flows in succession to the heat exchanger cyclones 114, 113, 112 and 111 and the air L leaves the heat exchanger component 110 as exhaust air A. The raw meal delivery device 1 proposed here can be designed to feed the raw meal coming from the next to last heat exchanger cyclone 113, dispersed as much as possible, through a raw meal line 120 to the calciner 170. For this, the raw meal delivery device 1 is mounted directly on the calciner 170. Alternatively or additionally, the raw meal delivery device 1 can be arranged on a riser 112', 113' of the cyclone heat exchanger 110, in order to suspend the raw meal more quickly and completely in the swirl of a heat exchanger cyclone 112, 113.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

LIST OF REFERENCE SIGNS

1 Raw meal delivery device
2 Connection line
3 Raw meal chute
4 Weight
4' Weight
5 Compensator
6 Fuel supply
7 Flange
8 Flange
10 Baffle slide
11 Bottom
12 Surface
13 Surface
14 Indentation
15 Edge
16 Surface
17 Surface
100 Layout
110 Cyclone heat exchanger
111 Heat exchanger cyclone
112 Heat exchanger cyclone
112' Riser
113 Heat exchanger cyclone
113' Riser
114 Heat exchanger cyclone
114' Hot meal line
120 Raw meal line
130 Descending branch
140 Rotary kiln
141 Rotary kiln inlet chamber
150 Clinker cooler
151 Cooling head
160 Tertiary air line
170 Calciner
A Exhaust air
G Gas
L Air
P Arrow
P' Arrow
R Raw meal
S Flow direction
Z Cement clinker

The invention claimed is:

1. A raw meal delivery device for delivery of raw meal into a gas line or to a reactor of a layout for production of cement clinker, comprising a connection line for connecting a raw meal line to the gas line or the reactor, an inclined raw meal chute, which is situated inside the connection line and by which raw meal gets from the raw meal line into the gas line or the reactor, wherein at a foot of the raw meal chute there is arranged a baffle slide, which protrudes into a path of a flow of raw meal flowing along the raw meal chute and deflects incoming raw meal, wherein a substantially convex displacement body is arranged on the baffle slide, which lies in the path of the incoming raw meal and disperses the flow of raw meal.

2. The raw meal delivery device according to claim 1, wherein the substantially convex displacement body is a tetrahedron situated on a surface, wherein one edge of the tetrahedron is oriented from the bottom of the baffle slide in a flow direction of the flow of raw meal.

3. The raw meal delivery device according to claim 2, wherein one side of the tetrahedron present in the flow direction is an obtuse triangle.

4. The raw meal delivery device according to claim 2, wherein one side of the tetrahedron present in the flow direction is open.

5. The raw meal delivery device according to claim 2, wherein the edge has an abrasion-resistant reinforcement.

6. The raw meal delivery device according to claim 2, wherein the surfaces of the tetrahedron emerging from the edge have indentations in the flow direction.

7. The raw meal delivery device according to claim 1, wherein a bottom surface of the substantially convex displacement body extends across an entire width of the baffle slide.

8. The raw meal delivery device according to claim 1, wherein the gas line comprises a riser of a heat exchanger cyclone.

9. The raw meal delivery device according to claim 1, wherein the reactor comprises a calciner.

* * * * *